Aug. 10, 1954  E. L. SINCLAIR  2,686,111
CONTACT MATERIAL DISCHARGE APPARATUS
Filed July 24, 1946  3 Sheets-Sheet 2
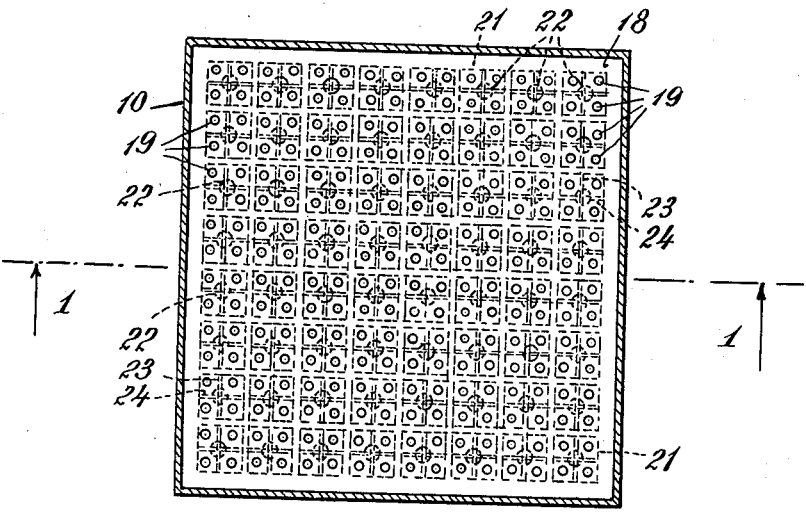
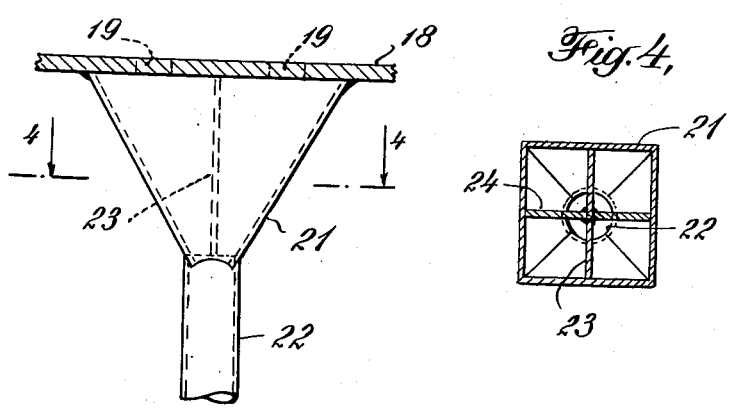
INVENTOR
EDWARD L. SINCLAIR
BY
John A. Crowley Jr.
AGENT OR ATTORNEY Aug. 10, 1954    E. L. SINCLAIR    2,686,111
CONTACT MATERIAL DISCHARGE APPARATUS
Filed July 24, 1946
3 Sheets-Sheet 3

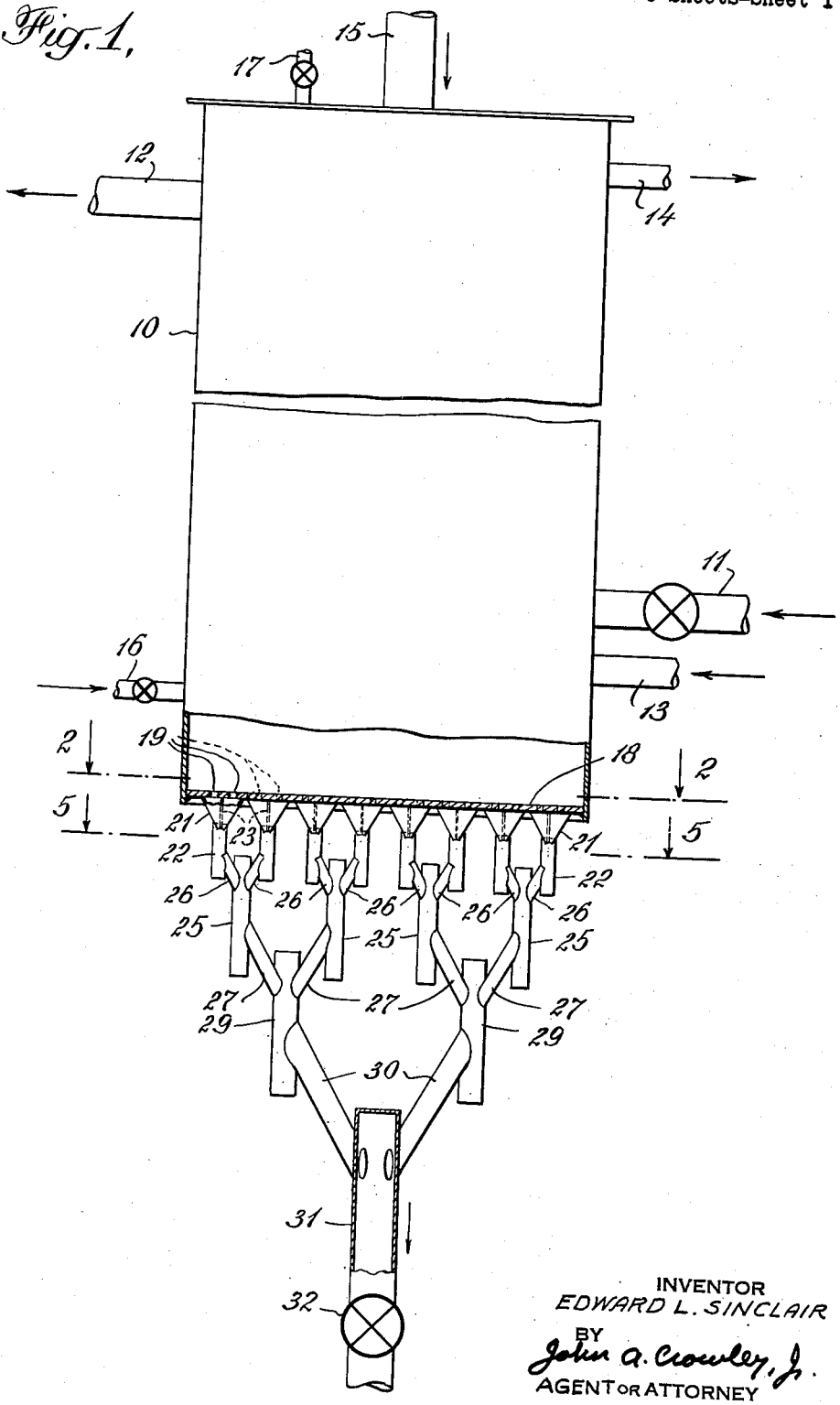

INVENTOR
EDWARD L. SINCLAIR
BY
John A. Crowley, Jr.
AGENT OR ATTORNEY

Patented Aug. 10, 1954

2,686,111

UNITED STATES PATENT OFFICE 2,686,111

CONTACT MATERIAL DISCHARGE APPARATUS

Edward L. Sinclair, Manhasset, N. Y., assignor to Socony-Vacuum Oil Company, Incorporated, a corporation of New York Application July 24, 1946, Serial No. 685,833

3 Claims. (Cl. 23—288)

This invention relates to a system for the conversion of hydrocarbons in the presence of a moving bed of particle-form contact material. The invention deals specifically with certain improvements in apparatus for controlling the flow of moving beds in hydrocarbon conversion systems.

Exemplary of the hydrocarbon processes to which this invention may be applied are the catalytic hydrogenation, dehydrogenation, aromatization, reforming, polymerization, isomerization, treating desulphurization and cracking of hydrocarbons. In its broadest aspects the invention is applicable to any process wherein a particle-form solid material is moved as a substantially compact column through a gas-solid contacting zone. Typical of the processes to which this invention may be applied is a continuous cyclic process for catalytic cracking of hydrocarbons wherein a particle-form catalyst is passed cyclically through a conversion zone wherein it moves as a substantially compact bed or column while being contacted at temperatures of the order of 800° F. or higher and at pressures usually above atmospheric with a petroleum gas oil to effect the conversion thereof to lower boiling gasoline containing constituents and then through a regeneration zone wherein the catalyst flows as a substantially compact column while being subjected to an elevated temperature to a combustion supporting gas acting to burn off from the catalyst contaminants deposited thereon in the conversion zone.

The contact material employed in such processes may range in particle size broadly from about 3 to 100 mesh and preferably from about 4 to 20 mesh as measured by Tyler Standard Screen Analysis.

In such a cyclic process, it is customary to remove solid material from the bottom of the conversion or catalyst regeneration vessel through a single centrally located outlet conduit which is only a fraction of the diameter of the vessel thereabove. As a result, very uneven flow of solid particles within the vessel occurs, the flow being excessive in that portion of the vessel cross-sectional area directly over the solid outlet and being very low in more remote portions of the vessel cross-sectional area.

Such uneven flow gives rise to uneven deposition of carbonaceous contaminant on the catalyst in the reactor and to uneven and unsatisfactory regeneration of the catalyst in the regenerator.

It is the specific object of this invention to provide an improved apparatus for withdrawal of particle-form contact material from gas-solid contacting vessels.

A further object of this invention is to provide an apparatus for withdrawal of particle-form contact material from a hydrocarbon reaction zone while maintaining uniform flow of catalyst in all portions of the reaction zone and while providing a substantial resistance to escape of gases from the reaction zone through the catalyst withdrawal system.

These and other objects of the invention will become apparent from the following discussion of the invention.

This invention may be most readily understood by reference to the drawings attached hereto of which Figure 1 is an elevational view, partially in section, showing the application of this invention to a gas-solid contacting vessel;

Figure 2 is a plan view taken at line 2—2 of Figure 1;

Figures 3 and 4 are detailed views of certain of the elements shown in the apparatus of Figures 1 and 2;

Figure 5:
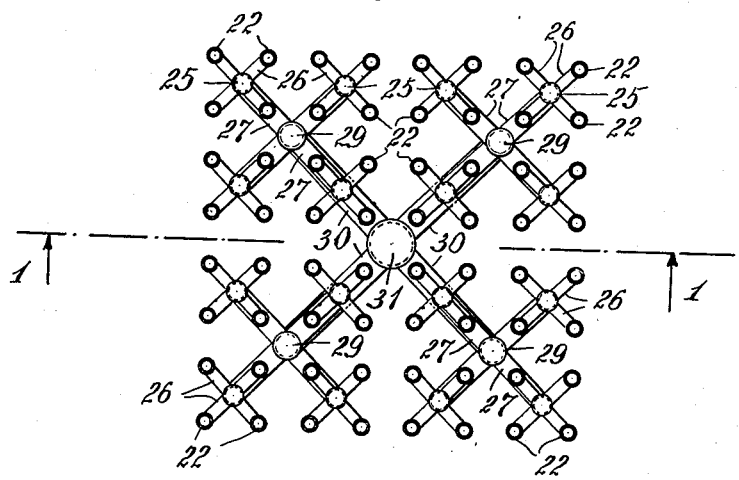
Figure 5 is a plan view looking downward from line 5—5 of Figure 1.

All of the drawings are highly diagrammatic in form.

Turning now to Figure 1, we find a conversion vessel 10 having reactant inlet 11 near its lower end and a reactant outlet 12 near its upper end. The functions of conduits 11 and 12 may be interchanged when concurrent flow of gas and solid is desired. Heat exchange tubes (not shown) may be provided within the reactor if desired. Heat exchange fluid may enter these tubes through conduit 13 and leave through conduit 14. An inert seal or purge gas may be admitted near the lower end of the reactor through conduit 16. An inert seal gas may also be admitted to the upper end of the reactor through conduit 17. Contact material may be supplied to the upper end of reactor 10 through conduit 15. A plate 18 forms the bottom of the reactor. In the plate 18 are provided a plurality of equally spaced apertures 19 arranged in groups of four, the groups being distributed across the vessel cross-sectional area. The apertures should be equal in size. The arrangement may be more clearly seen by reference to Figure 2 along with Figure 1. The lower portion of the apparatus in Figure 1 is shown in section, the cut being taken along the plane of line 1—1 in Figure 2. It will be seen from Figure 2 that the vessel 10 is of square cross-sectional shape and that the groups of apertures 19 are arranged in a square pattern. While a vessel of square or rectangular cross-sectional shape is preferred, it will be understood that this invention may be employed in combination with vessels of other cross-sectional shapes. Welded or fastened to the underside of plate 18 are a plurality of funnels 21 which are of square cross-sectional shape and of such size that each funnel receives solid flow from a complete group of four apertures. The funnel construction may be better understood by reference to Figures 3 and 4 which show one of the funnels 21 in detail. It will be noted that each funnel 21 connects on its lower end around a short vertical conduit 22 which is open on its upper end and closed on its lower end. Vertical partitions 23 and 24 extend the full height of each funnel 21 so as to divide it into four separate parts, corresponding to the four apertures from which the funnel receives solid flow. The arrangement is such as to provide a separate, confined passage for solid flow from each of the four apertures 19 in each group thereof to the upper open end of a conduit 22. Thus, at the level of conduits 22 in Figure 1, there are provided a plurality of confined vertical streams equal to only one-fourth of the number of apertures thereabove.

Looking now at Figure 5, which is a plan view taken at the plane of line 5—5 of Figure 1 and also looking at Figure 1, it will be noted that below the level of the sixty-four conduits 22 there is provided another group of conduits comprising sixteen vertical conduits 25. The conduits 25 are so positioned that each conduit 25 is symmetrically horizontally staggered between four of the conduits 22 thereabove. A conduit 26 extends downwardly from each conduit 22 to a level in a conduit 25 therebelow. Four conduits 22 are thus connected into each conduit 25 by means of a merging conduit 26. It is important that all the four conduits 26 connecting into any given conduit 25 connect into that conduit at a common level and that all of the conduits 25 are positioned at about the same level. The sixteen conduits 25 are similarly merged by means of conduits 27 into four separate conduits 29. The conduits 29 are then similarly merged by means of conduits 30 into a single centrally located discharge conduit 31 positioned symmetrically therebelow.

In operation, the particle-form catalyst passes downwardly through vessel 10 as a substantially compact column while being contacted with hydrocarbon reactant introduced at 11 and withdrawn at 12. Spent catalyst is withdrawn uniformly from all portions of the vessel cross-sectional area as a plurality of equal confined streams passing through apertures 19. These streams pass through the separate passages provided in funnels 21 to be combined by fours into a plurality of streams in conduits 25 equal to only one-fourth the number of apertures 19. The streams are then repeatedly merged in fours at a series of levels until only four separate confined streams remain in the four conduits 29. These four streams are merged through conduits 30 at a common level in the single discharge conduit 31. The flow of catalyst is throttled by means of valve 32 on conduit 31 so as to maintain a continuity of solid body upwardly from the level of valve 32 through all of the intermediate conduits to the column of catalysts in the reaction vessel 10. In this manner, the throttling effect of valve 32 is transmitted through the solid body in all the branch conduits to the level of the apertures 19. In order to insure equal flow of solid through all of the apertures 19, the throttling effect of valve 32 must be transmitted equally to all apertures 19 regardless of their relative positions in the vessel cross-sectional area. In order to provide this equal throttling at all apertures it is important that the stream merging at any given stage must be conducted in such a manner that any group of streams merging into a single stream must merge into the single stream at a common level and that the rate of solid flow at the level of stream mergence in the drain conduit 31 must be substantially uniform across the conduit cross-sectional area. It has been found that substantially uniform solid flow may be provided at the level of stream mergence in conduit 31 by spacing the valve 32 on conduit 31 at least two diameters below the level of intersection of conduits 30 into conduit 31. The feature of positively directing the flow of any given stream through a separate confined passage insures the positive mergence of streams at a common level and also provides an effective seal against vapor loss between the reactor and drain conduit 31 in the form of elongated compact, confined streams of catalyst of very limited cross-sectional area.

It has been found desirable, although not in all cases necessary, to gradually increase the size of conduits beginning with conduits 22 and ending with conduit 31. In order to insure proper solid flow in the merging conduits 26, 27 and 30, these conduits should be positioned at a slope of at least about 45 degrees with the horizontal.

Figure 6:
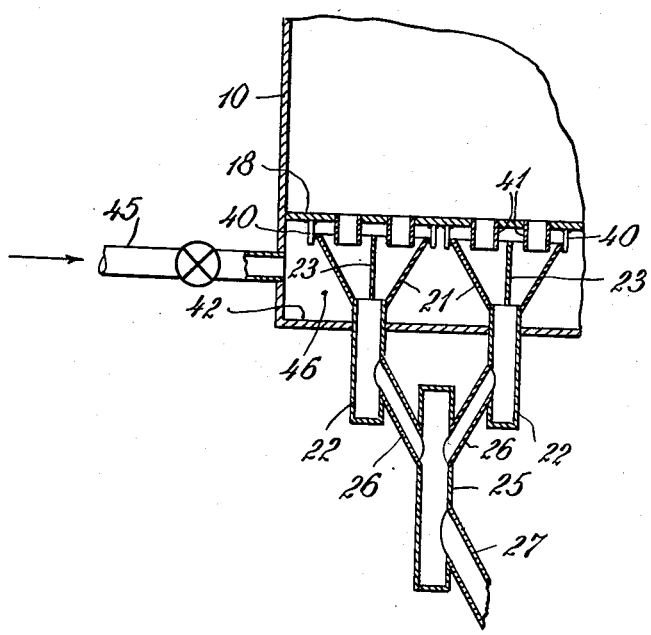
Figure 6 is an elevational view, partially in section, showing a section of the lower end of a reaction vessel and a modified form of the invention.

A somewhat modified form of the invention is shown in Figure 6 which is an elevational view, partially in section, of a portion of the lower end of a conversion vessel 10 with the modified form of this invention combined therewith. In Figure 6, elements which are identical with elements in Figure 1 are given like numerals. In the form of the invention shown in Figure 6, no apertures are provided in the bottom closure 42 of the vessel 10, but a partition 18 is positioned across vessel 10 a spaced distance above the bottom thereof to provide a gas chamber 46. Apertures are provided in partitions similar to those in bottom closure 18 of Figure 1. A short nipple 41 is fitted tightly in each of said apertures, the nipple terminating above the bottom closure 42. A plurality of funnels 21 having a central downspout 22 are suspended by rods 40 below the partition 18. Each funnel is of such size as to cover the area of partition 18 controlled by four downspouts 41, so that each funnel receives solid flow from four downspouts. Each funnel is partitioned by means of crossed partitions of which one, 23, can be seen in the drawing to divide it into four compartments corresponding to the four nipples 41 from which it receives solid flow. The downspouts 22 pass tightly through the bottom closure 42. The downspouts 22 correspond to the conduits 22 in Figure 1 and are combined in the manner shown in Figure 1 until only one single discharge conduit remains. An inert purge gas may be admitted to the gas space 46 from which it flows over the upper edges of funnels 21 into the mass of contact material therein and up through nipples 41 into the column of contact material in the purge zone. This means of purge and seal gas introduction may be substituted for the conduit 16 shown in Figure 1. This improvement insures very uniform and efficient purging of the outflowing contact material.

While the invention has been specifically described hereinabove in connection with the hydrocarbon conversion vessel, it should be understood that it may be also applied to catalyst regeneration and other gas-solid contacting vessels. The examples of operating conditions and details of apparatus construction given hereinabove is intended as illustrative and is not to be construed as limiting the scope of this invention except as it may be limited by the following claims.

I claim:

1. Apparatus for effecting contact of gas with a particle form contact material flowing as a moving bed which comprises: a gas solid-contacting chamber, means for introducing contact gas into said chamber and means for withdrawing contacted gas from said chamber, means for introduction of contact material into the upper section of said chamber, said chamber having a bottom closure and said bottom closure having therein a plurality of spaced, equal apertures for solid withdrawal arranged in groups of four, uniformly distributed over its horizontal cross-sectional area, a single discharge conduit spaced vertically below said bottom closure and flow throttle means associated with said discharge conduit, a funnel having a single centrally positioned downspout suspended from said bottom closure and positioned below each group of four apertures, each of said funnels being of sufficient size to receive the solid flow from four of said apertures, partitioning within each funnel defining four passages for solid flow, one corresponding to each aperture, from the top of the funnel to the inlet to its downspout, at least one group of vertical pipes positioned at levels intermediate said downspouts and said single discharge conduit, the pipes in any group being at the same level and numbering only one fourth of the pipes in the group next above and the number of pipes in the group first below said downspouts being one fourth the number of downspouts, the number of groups of pipes provided being one less than the power to which the number 4 must be raised to give the number of said downspouts, downwardly sloping conduit means connecting each of four downspouts to one of the pipes in the group first below said downspouts, conduit means connecting the pipes in any group with pipes in the group next below, each of four pipes in any group being connected by a separate conduit into a single pipe in the group next below, conduit means connecting the four pipes of the lowermost group into said dicharge conduit.

2. Apparatus for effecting contact of a gas with a particle form contact material flowing as a moving bed which comprises: a gas-solid contacting vessel having a bottom closure, a gas outlet from said vessel, means to introduce solid particles into the upper section of said vessel, a partition across said vessel a spaced distance above said bottom closure, said partition having a plurality of spaced, equal apertures therein, uniformly distributed in sets of four over the entire horizontal cross-sectional area of said partition, a short conduit fitted within each aperture, said conduits being open on either end and terminating on their lower ends substantially above said bottom closure, a funnel having a single centrally positioned downspout positioned a spaced distance below said partition and positioned below each group of four conduits, each of said funnels being of sufficient size to receive the solid flow from four of said conduits, the downspouts of said funnels passing tightly through said bottom closure and having closed lower ends which terminate below said bottom closure, partitioning dividing each funnel above its downspout into four compartments corresponding to the four conduits from which it receives solid flow, a gas inlet conduit connected into the vessel shell between the levels of said partition and said bottom closure, a single discharge pipe spaced vertically below said funnel downspouts, and flow throttling means associated with said discharge pipe, at least one group of vertical pipes positioned intermediate said downspouts and said single discharge pipe, the pipes in any group being at the same level and numbering one-fourth the number of pipes in any group next above, and the pipes numbering four in that group next above the single discharge pipe and numbering one-fourth the number of downspouts in that group next below the downspouts, downwardly sloping conduit means connecting each of four downspouts to one of the pipes in the group next below said downspouts, similar conduit means connecting the four pipes in the group next above said single discharge pipe to said discharge pipe, and similar downwardly sloping conduit means similarly connecting the pipes in any other group to the pipes in the group next below.

3. In combination, a housing through which particulate contact material passes downwardly as a moving bed under the influence of gravity, a main conduit coinciding with the longitudinal axis of said housing and adapted to be traversed by all of the contact material passing therefrom, a contact mass retaining baffle horizontally positioned in the lower portion of said housing and having a plurality of apertures therein for the passage of contact material, said apertures being arranged regularly over the horizontal area of said baffle in symmetrical groups, a plurality of funnels positioned below said baffle in communicating relation with said apertures, each of said funnels communicating with and encompassing a single symmetrical group of apertures, a splitter plate in each of said funnels, said splitter plate comprising a plurality of imperforate vertical members each extending from the wall of the funnel and meeting the other members along the vertical axis of said funnel, the bottoms of all of said members terminating in a common plane, the number of such members being equal to the number of apertures in the respective symmetrical group of apertures encompassed by said funnel so that adjacent members and the portion of said wall therebetween define an individual passageway for the contact material discharged from a single aperture and a totally enclosed pipe system extending from the bottom of said funnels to said main conduit.

References Cited in the file of this patent

UNITED STATES PATENTS

| Number | Name | Date |
|---|---|---|
| 2,412,135 | Evans | Dec. 3, 1946 |
| 2,412,136 | Evans et al. | Dec. 3, 1946 |

FOREIGN PATENTS

| Number | Country | Date |
|---|---|---|
| 12,490 of 1895 | Great Britain | May 23, 1896 |